United States Patent [19]

Roberge

[11] Patent Number: 5,023,431
[45] Date of Patent: Jun. 11, 1991

[54] LINEARIZED THERMAL FEEDBACK CIRCUIT AND TEMPERATURE CONTROLLER CIRCUIT UTILIZING THE SAME

[75] Inventor: James K. Roberge, Lexington, Mass.

[73] Assignee: Massachusetts Institute of Technology, Cambridge, Mass.

[21] Appl. No.: 392,404

[22] Filed: Aug. 11, 1989

[51] Int. Cl.$^5$ .............................................. H05B 1/02
[52] U.S. Cl. ................................... 219/494; 219/501; 219/505; 219/497; 340/589
[58] Field of Search ............... 219/491, 494, 497, 499, 219/501, 504, 505, 507, 509; 307/117; 340/588, 589, 584

[56] References Cited

U.S. PATENT DOCUMENTS

| | | | |
|---|---|---|---|
| 3,413,446 | 11/1968 | Rogers | 219/501 |
| 3,784,843 | 1/1974 | Gustus | 219/497 |
| 4,232,763 | 4/1982 | Goldsmith | 219/497 |
| 4,495,405 | 1/1985 | Foster | 219/497 |
| 4,516,242 | 1/1982 | Yokota | 350/358 |
| 4,554,439 | 11/1985 | Cross et al. | 219/497 |
| 4,571,728 | 7/1985 | Yoshikawa | 372/36 |
| 4,583,228 | 4/1986 | Brown et al. | 372/32 |
| 4,730,101 | 3/1988 | Mahon et al. | 219/497 |
| 4,774,685 | 1/1985 | Samuels | 364/718 |

FOREIGN PATENT DOCUMENTS

| | | |
|---|---|---|
| 8504055 | 3/1985 | European Pat. Off. . |
| 3048533 | 10/1985 | Fed. Rep. of Germany . |
| 57-149784 | 9/1982 | Japan . |
| 5934684 | 5/1984 | Japan . |
| 59-031081 | 8/1984 | Japan . |
| 62177987 | 4/1987 | Japan . |

Primary Examiner—M. H. Paschall
Attorney, Agent, or Firm—Hamilton, Brook, Smith & Reynolds

[57] ABSTRACT

A temperature controller for a thermal system comprises a linearized feedback loop. A linearized thermistor and heating element are disclosed. A current source adjusts the bias current of the thermistor so that the thermistor voltage is equal to a given voltage when the thermistor is at the desired temperature. When the thermistor is biased in this way, the incremental gain from temperature errors to thermistor voltage errors becomes independent of set point. The heating element includes a power regulator and a power resistor. Because temperature is a linearly related to the power dissipated in the power resistor, square-law circuitry keeps the voltage output of the power regulator linearly related to the square root of the error in the controlled temperature. In other embodiments of the invention, a voltage source adjusts the bias voltage of the thermistor so that the incremental gain from temperature errors to thermistor current errors is independent of set point.

21 Claims, 2 Drawing Sheets $$\frac{dR(Temp)}{dTemp} = -\frac{1}{25} R(Temp)$$

$$\text{Gain} = -\frac{dV_{TH}}{dTemp} = -I_{BIAS} \frac{dR(Temp)}{dTemp} = -I_{BIAS} \left[\frac{-1}{25} R(T_0)\right]$$

$$= \frac{2.5 \text{ Volts}}{R(T_0)} \left[\frac{1}{25} R(T_0)\right] = \frac{2.5}{25} \frac{\text{Volts}}{°C} = .1 \frac{\text{Volts}}{°C}$$

LINEARIZED THERMAL FEEDBACK CIRCUIT AND TEMPERATURE CONTROLLER CIRCUIT UTILIZING THE SAME

The United States Government has rights in this invention pursuant to grant number AF19628-85-C-0002 awarded by the Air Force.

BACKGROUND OF THE INVENTION

This invention relates to high-precision electronic temperature controller circuits.

Many processes and technical applications require precise control of the temperature of a thermal system. In known systems, this function can be accomplished by a temperature controller. Temperature controllers typically influence the temperature of the thermal system through the use of heating and/or cooling devices. In some known systems, a sensor is used to sense the resulting temperature. Where a sensor is employed, a feedback loop is used to control the heating and/or cooling devices, and to thereby control the temperature of the thermal system.

SUMMARY OF THE INVENTION

The present invention provides a method and apparatus for stable and precise control of the temperature of a thermal system by linearizing the response of a temperature sensor and heat transfer element.

In one aspect of the present invention, a heat transfer element and an exponentially nonlinear temperature sensor are provided and configured to be thermally coupled to a thermal system. A linearization device for linearizing the temperature response of the temperature sensor is provided. The heat transfer element is responsive to the sensor for controlling the temperature of the thermal system to a desired temperature.

This aspect may include various of the following features:

The exponentially nonlinear temperature sensor is a thermistor, and the linearizing element is a current source for controlling the bias current of the thermistor to a fixed value. The voltage of the thermistor is sensed by an amplifier. The bias current set by the current source is such that the thermistor voltage is substantially equal to a predetermined voltage when the thermistor is at the desired temperature.

The linearizing element is a voltage source controlling the voltage across the thermistor. In this case, incremental changes in the thermistor current are sensed by the amplifier, and the bias voltage set by the voltage source is such that the thermistor current is substantially equal to a predetermined current when the thermistor is at the desired temperature.

The heat transfer element is responsive to the amplifier via a compensation device. The transfer function of the compensation device is such that the controller feedback loop (formed from the thermal system, the thermistor, the amplifier, the heat transfer element, and the compensation device) is stable.

The compensation device includes an integrating pole. The integrating pole ensures that the temperature of the thermal system is substantially equal to the desired temperature when the feedback loop is at equilibrium.

The heat transfer element is configured so that the heat transferred to the thermal system is substantially linearly related to the error between the desired temperature and the temperature sensed by the thermistor.

According to another aspect of the invention, the heat transfer element includes a power regulator with an output terminal pair and an input control quantity. A resistive element is electrically connected to the output terminal pair and thermally coupled to the thermal system. The voltage across the output terminal pair is substantially linearly related to the square root of the control quantity.

This aspect may include various of the following features:

The power regulator includes a linear regulator or a switching power amplifier for driving the output terminal pair and a square-law circuit responsive to the input quantity for controlling the linear regulator.

The square-law circuit comprises a translinear transistor circuit.

Other features and advantages of the invention will become apparent from the following detailed description and the claims.

DESCRIPTION OF THE PREFERRED EMBODIMENT

We first briefly describe the drawings.

STRUCTURE

Figure 1:
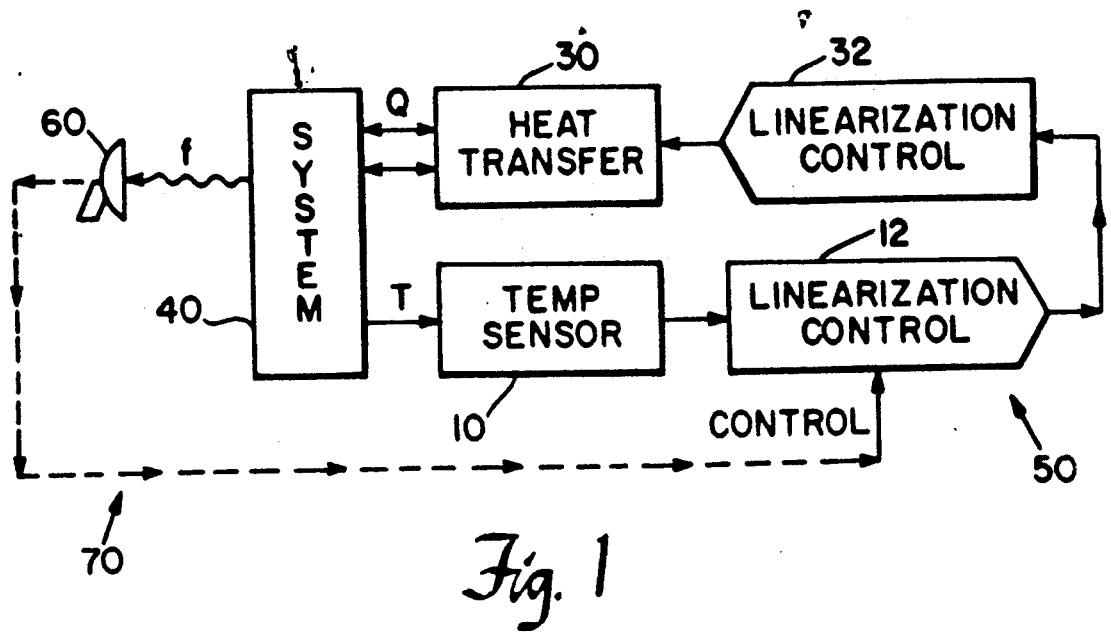
FIG. 1 is a block diagram of a temperature controller feedback loop according to the invention.

As seen in the block diagram of FIG. 1, a preferred embodiment of the present invention relates to a temperature control feedback loop 50 for controlling the temperature of a system 40 requiring thermal control. The feedback loop includes temperature sensor 10, linearization and control element 12 for temperature sensor 10, heat transfer element 30, and linearization and control element 32 for heat transfer element 30, and is closed by thermal system 40.

In one embodiment of the invention, thermal system 40 is a laser diode and its supporting structure, and resides in a communications satellite. The temperature controller feedback loop 50 tightly controls the temperature of the laser diode to maintain a constant laser output frequency f. This output frequency is sensed by antenna 60 (typically earth-stationed). Frequency errors are corrected by changing the setpoint of the feedback loop through earth-to-satellite control link 70. In this embodiment, to reduce jitter in the diode output frequency, and minimize the use of earth-to-satellite control link 70, feedback loop 50 must exert very stable control of the temperature of the laser diode. If the feedback loop is linear then loop stability is provided over a wide range of operating points.

The response of temperature sensor 10 is exponentially nonlinear with temperature. Linearization element 12 linearizes this response to allow linear control of the feedback loop. In addition, to further linearize the system, the loop is configured such that the heat transfer Q between thermal system 40 and heat transfer element 30 is linearly related to the temperature error sensed by temperature sensor 10.

Figure 2:
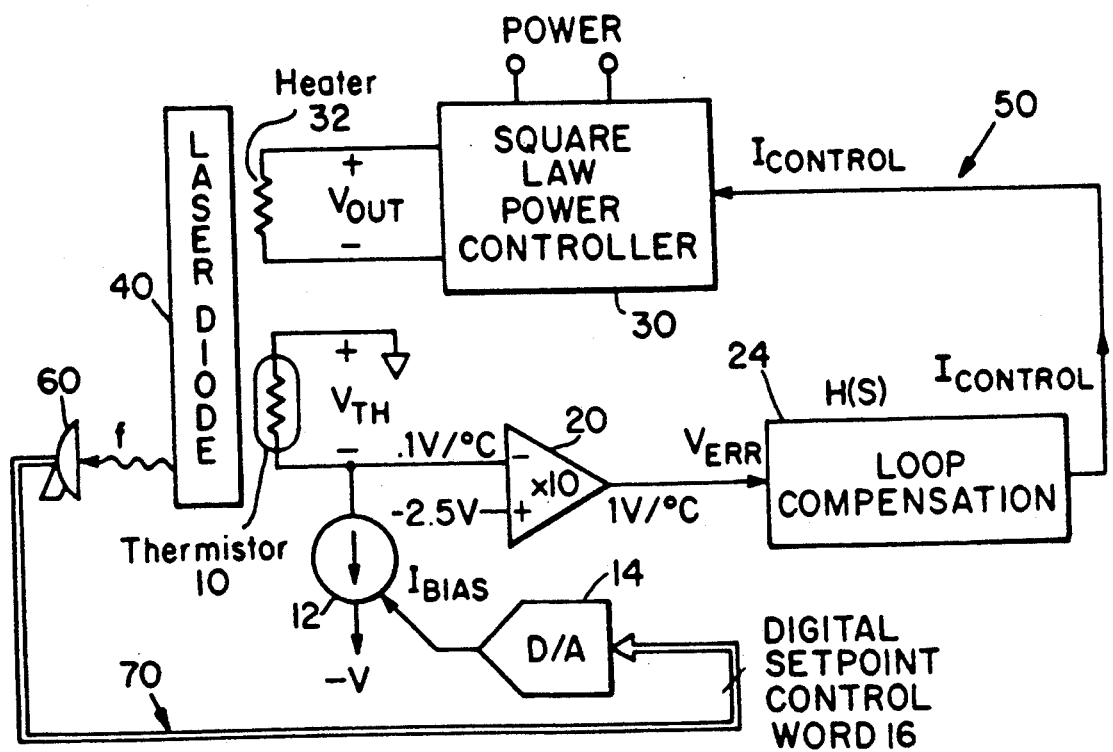
FIG. 2 is a diagram of an embodiment of the temperature controller of FIG. 1.

A particularly preferred embodiment of the inventive feedback loop is shown in FIG. 2. Temperature sensor 10 is a thermistor. Thermistors can be connected to provide considerably more sensitivity than semiconductor junction sensors. Therefore, thermistors are attractive in high precision applications.

Thermistor 10 is used to sense the temperature of thermal system 40. The thermistor 10 current is controlled by an analog current source 12. The current source current $I_{BIAS}$ is set via digital setpoint control word 16, which is interfaced to analog current source 12 through digital to analog converter 14. The digital control word is obtained from earth-to-satellite control link 70. To enhance the accuracy of the system, control word 16 may comprise sixteen or more bits. In other embodiments, an analog control voltage may be used in the place of digital to analog converter 14 and control word 16.

The resistance of the thermistor R(TEMP) is a function of the thermistor temperature. Current source 12 is adjusted such that the thermistor 10 voltage $V_{TH}$ is 2.5 volts when thermal system 40 is at the desired temperature $T_0$. (Thus by Ohm's Law $I_{BIAS}=2.5/R(T_0)$ ) Because the thermistor current is constant, errors in the thermistor voltage $V_{TH}$ away from 2.5 volts are caused by temperature errors in thermal system 40. As will be discussed later, one-tenth of a volt of error represents one degree of Celsius temperature error. This voltage error is sensed by differential amplifier 20, which has a voltage gain of ten. One volt at the output of amplifier 20 thus represents one Celsius degree of temperature error. The output of differential amplifier 20 is used to control heating element 30.

In other embodiments, current source 12 may be set to produce a thermistor voltage $V_{TH}$ which is greater or less than 2.5 volts at the desired temperature $T_0$. With larger equilibrium values of $V_{TH}$, the temperature sensitivity can be increased, but the self-heating effects in the thermistor (which reduce accuracy) also increase. Preferred embodiments of the invention use voltages near 2.5 volts as a compromise between the above effects.

Loop compensation device 24, having transfer function H(s), is included between differential amplifier 20 and controller 30 to stabilize the loop dynamics. Loop compensation device 24 may include an integrator circuit so that the open-loop gain of the system is near infinite. With a near infinite open-loop gain, the steady state temperature error of the loop is minimized. Compensation device 24 is implemented by filter amplifiers, integrators, or other such well known means.

The output of loop compensation device 24 is applied to the control input of power controller 30, closing feedback loop 50. In preferred embodiments, the output of loop compensation device 24 is a current $I_{CNTRL}$. A current is used to alleviate grounding errors which may adversely affect the performance of the loop.

Heating resistor 32 is used to heat thermal system 40. In alternative embodiments, heating and cooling mechanisms may be included. To linearize the feedback loop, output voltage $V_{OUT}$ of power controller 30 is linearly related to the square root of input current $I_{CNTRL}$, so that the power dissipated in heating resistor 32 is linearly related to control current $I_{CNTRL}$. This ensures that the heat transferred to thermal system 40 is linearly related to the temperature error of the system. The above linearizes the feedback loop because the linear variables in thermal systems are temperature and power. In alternative embodiments where both a heating and cooling mechanism are included, they are preferably configured such that the total heat transfer is linearly related to control current $I_{CNTRL}$.

Power controller 30 may include a switching power amplifier, a linear amplifier, or other such well known power amplification means. The power controller input/output square-law relationship discussed above can be obtained through the use of an internal feedback loop which compares the square of the output of the power amplifier to the input of the power amplifier. The square of the power amplifier output may be obtained using a translinear transistor circuit, or any other analog or digital multiplication or squaring means.

DISCUSSION

In order to achieve the highest possible performance from a temperature control system, it is necessary to design the feedback loop to be as linear as possible. Two techniques are employed in the invention to achieve this desired linearity.

Temperature Sensor Nonlinearity

Figures 3, 4:
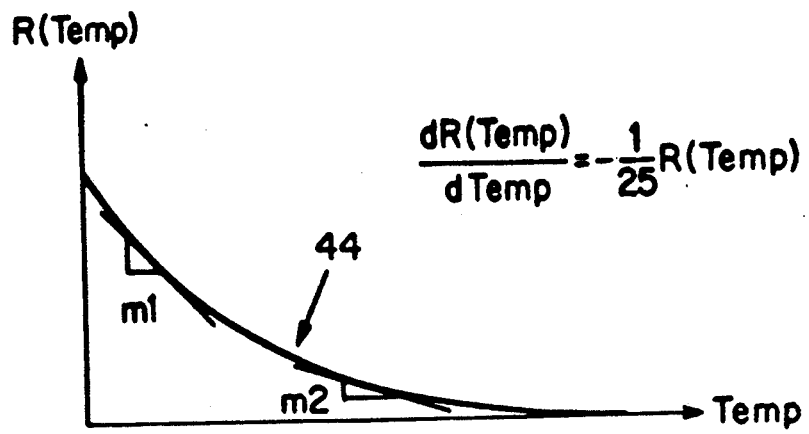
FIG. 3 is a plot of the resistance of a thermistor as a function of temperature.
FIG. 4 depicts equations demonstrating the linear thermistor gain achieved by the invention.

The first source of nonlinearity is temperature sensor 10. A thermistor is preferable because it may be connected to provide considerably more sensitivity than, for example, semiconductor junction sensors. However, the resistance vs. temperature characteristic of a thermistor is quite nonlinear. As seen in FIG. 3, temperature characteristic curve 44 is approximately exponential. As illustrated by the differential equation above the curve of FIG. 3, the resistance R(TEMP) of a typical thermistor changes approximately 4% for each Celsius degree of temperature change. For the thermistor used in the invention, marketed by Fenwal Electronics under part No. 196-202LAG-001, the thermistor resistance ranges from 5 kohm to 1 kohm over a temperature range of −4 to +38 degrees Celsius. For this resistance range, a thermistor bias voltage of 2.5 volts is a good compromise between temperature sensitivity and self-heating. As a result, the gain from temperature change to thermistor resistance change dR(TEMP)/dTEMP can vary widely depending upon the temperature of the system. FIG. 3 illustrates two slopes, m1 and m2, which indicate this gain at two different points of the exponential curve. The invention achieves precision control of the system temperature by reducing the effect of the gain shifts in dR(TEMP)/dTEMP.

To linearize the thermistor characteristic, the loop includes current source 12, which biases the thermistor current such that the thermistor voltage $V_{TH}$ is 2.5 volts at the set point temperature. (Thus by Ohm's Law $I_{BIAS}=2.5/R(T_0)$—for the range of thermistor resistances discussed above, the bias current $I_{BIAS}$ will be in the range of 0.5 to 2.5 mA.) Because the thermistor current is constant, errors in the thermistor voltage $V_{TH}$ away from 2.5 volts are indicative of temperature errors in thermal system 40. Because the voltage of the thermistor is sensed by differential amplifier 20 and used to control feedback loop 50, the "gain" of the thermistor is the quantity $dV_{TH}/dTEMP$ (the change of the thermistor voltage $V_{TH}$ for one Celsius degree of temperature change). A fixed thermistor bias current ensures that this gain is constant, and thus ensures that the error of the thermistor voltage away from 2.5 volts is linearly related to the temperature error of the thermal system, independent of set point.

The linearity of the thermistor biasing method is illustrated in FIG. 4. Referring to FIG. 4, the gain of the thermistor is the quantity $dV_{TH}/dTEMP$. However, the thermistor voltage $V_{TH}$, by Ohm's Law, is equal to the quantity $I_{BIAS}*R(TEMP)$ (i.e. the thermistor bias current multiplied by the thermistor resistance). Substituting this expression into the gain expression $dV_{TH}/dTEMP$ yields $d[I_{BIAS}*R(TEMP)]/dTEMP$. Since $I_{BIAS}$ is a constant factor, it may be removed from the differentiation, resulting in the expression $I_{BIAS}*dR(TEMP)/dTEMP$. The quantity $dR(TEMP)/dTEMP$, however, is the change in the thermistor resistance per Celsius degree. As discussed in conjunction with FIG. 3, the change in the thermistor resistance per Celsius degree is about 4% of its current value. In other words, $dR(TEMP)/dTEMP = 0.04*R(TEMP)$. Substituting this value for $dR(TEMP)/dTEMP$, the gain of the thermistor is equal to the quantity $I_{BIAS}*0.04*R(TEMP)$. This expression may be further simplified by remembering that the bias current $I_{BIAS}$ is set such that $I_{BIAS} = 2.5/R(T_0)$. Substituting for $I_{BIAS}$, the gain of the thermistor becomes $[2.5/R(T_0)]*[0.04*R(TEMP)]$. Finally, assuming the feedback loop is near the setpoint, the thermistor resistance value $R(TEMP)$ can be approximated by the resistance of the thermistor at setpoint temperature $R(T_0)$. Under this assumption, the $R(T_0)$ terms cancel out of the gain equation, and the gain becomes $[2.5]*[0.04]$, or approximately 0.1 volt per Celsius degree, independent of the setpoint temperature $T_0$. Therefore, the gain shifts illustrated by m1 and m2 (FIG. 3) have been eliminated, and the temperature sensor has been linearized.

In alternative embodiments of the invention, a voltage source may be substituted for current source 12 to linearize the thermistor gain. In these embodiments, the voltage source would set the voltage across thermistor 10 such that the thermistor current is equal to a predetermined value when the thermal system temperature is equal to the desired temperature. Circuitry is then implemented to sense errors in the thermistor current. Errors in the thermistor current away from the set point value are linearly related to the temperature error of the system, with a constant gain. The governing equations for these embodiments hold a dual relationship (i.e., all voltages are replaced with currents, and vice-versa) to the equations of FIG. 4. Therefore, embodiments with a voltage source substituted for a current source are within the scope of this invention.

Heat Transfer Nonlinearity

Another source of nonlinearity is reduced by the system of FIG. 2. Due to the governing equations for thermal systems, the temperature of a thermal system is linearly related to the heat transfer into or out of the system. Thus the temperature of system 40 is linearly related to the power dissipated in power resistor 32. To maintain linearity, therefore, feedback loop 50 should be configured such that the power dissipated in power resistor 32 is linearly related to the temperature error of the thermal system.

The power controller 30 control current $I_{CNTRL}$ is linearly related to the temperature error of the thermal system. However, the power dissipated in power resistor 32 is linearly related to the square of the resistor voltage $V_{OUT}$. Therefore, to maintain linearity in the feedback loop 50, the output voltage $B_{OUT}$ of power controller 30 should be linearly related to the square root of the input current $I_{CNTRL}$. This is accomplished using a square-law circuit in power controller 30 as previously described.

Loop Compensation

According to the invention, compensation device 24 is included to control the dynamics of the loop and stabilize the long-term loop behavior. In preferred embodiments, compensation device 24 includes an integrator circuit so that equilibrium is reached with near-zero error between the actual and set-point temperatures. This is particularly important in the embodiment of the invention discussed above, where the thermal system is a laser diode in a satellite. In this embodiment, the diode frequency must have low drift to reduce the usage of the earth-to-satellite control link 70. Using an integrator in compensation device 24, maximum deviations from the set point temperature of approximately 100 microdegrees Celsius have been demonstrated, suitable for very precise applications.

While the linearity-enhancing features described above are necessary for optimum long-term loop accuracy, the loop bandwidth is usually constrained by the thermal dynamics of the heater/thermistor structure. The system described above has achieved well-damped performance with crossover frequencies between 0.5 and 2 Hz with several different thermal systems 40.

The present invention has been illustrated in light of a particular embodiment. Other embodiments are within the scope of the appended claims.

What is claimed is:

1. A temperature controller for a thermal system having a variable setpoint temperature setting, the controller comprising:
   a heat transfer element configured to be thermally coupled to said thermal system;
   a temperature sensor having an exponentially nonlinear temperature response configured to sense the temperature of said thermal system; and
   a linearizing element for linearizing the temperature response of said sensor such that the sensor sensitivity near the setpoint temperature is independent of setpoint setting;
   said heat transfer element being responsive to the linearized response of said sensor to control the temperature of said thermal system to achieve the desired setpoint temperature.

2. The temperature controller of claim 1, wherein said heat transfer element is configured such that the heat it transfers is substantially linearly related to the error between said desired temperature and the temperature sensed by said sensor.

3. The temperature controller of claim 1, wherein:
   said sensor is a therminstor; and
   said linearizing element is a current source for controlling the current through said thermistor, said thermistor current being controlled by said current source such that the thermistor voltage is substantially equal to a predetermined voltage when said thermistor is at said desired temperature.

4. The temperature controller of claim 3 further comprising an amplifier and a compensation device through which said heat transfer element is responsive to said sensor, the temperature controller being configured such that a feedback loop is formed from said thermistor, said amplifier, said heat transfer element, and said compensation device, and wherein said compensation device has a transfer function which makes the feedback loop stable.

5. The temperature controller of claim 4, wherein said compensation device includes an integrating pole.

6. The temperature controller of claim 3, wherein said heat transfer element is configured such that the heat it transfers is substantially linearly related to the error between said desired temperature and the temperature sensed by said thermistor.

7. The temperature controller of claim 1, wherein:
said sensor is a thermistor, and
said linearizing element is a voltage source for controlling the voltage across said thermistor, said thermistor voltage being controlled by said voltage source such that the thermistor current is substantially equal to a predetermined current when said thermistor is at said desired temperature.

8. The temperature controller of claim 7, wherein said heat transfer element is responsive to said sensor via an amplifier and a compensation device having a transfer function, said transfer function being such that the feedback loop formed from said thermal system, said thermistor, said amplifier, said heat transfer element, and said compensation device is stable.

9. The temperature controller of claim 8, wherein said compensation device includes an integrating pole.

10. The temperature controller of claim 7, wherein said heat transfer element is configured such that the heat it transfers is substantially linearly related to the error between said desired temperature and the temperature sensed by said thermistor.

11. A temperature controller for a thermal system having a variable setpoint temperature setting, the controller comprising:
a heat transfer element configured to be thermally coupled to said thermal system; and
a temperature sensor configured to sense the temperature of said thermal system;
said heat transfer element being made linearly responsive to a sensed signal from said sensor for controlling the temperature of said thermal system to a desired setpoint temperature, such that the heat transferred by said heat transfer element is substantially linearly related to the error between said desired setpoint temperature and the temperature sensed by said sensor, said linear relationship being independent of the setpoint temperature setting.

12. The temperature controller of claim 11, wherein said heat transfer element comprises:
a power regulator with an output terminal pair and a control imput and
a resistive element electrically connected to said output terminal pair and configured to be thermally coupled to said thermal system,
the voltage across said output terminal pair being substantially linearly related to the square root of the signal applied to said control input.

13. The temperature controller of claim 12, wherein said power regulator comprises a switching power amplifier connected to said output terminal pair, and a square-law circuit responsive to the signal applied to said control input for controlling said switching power amplifier.

14. The temperature controller of claim 13, wherein said square-law circuit comprises a feedback loop and a translinear transistor circuit.

15. The temperature controller of claim 12, wherein said power regulator comprises a linear regulator connected to said output terminal pair, and a square-law circuit responsive to the signal applied to said control input for controlling said linear regulator.

16. The temperature controller of claim 15, wherein said square-law circuit comprises a feedback loop and a translinear transistor circuit.

17. A temperature controller feedback device for a variable setpoint temperature thermal system comprising:
a heat transfer element configured to be thermally coupled to said thermal system;
a temperature sensor having an exponentially nonlinear temperature response configured to sense the temperature of said thermal system; and
a linearizing element for linearizing the temperature response of said sensor such that the sensitivity near the setpoint temperature is independent of the setting of the setpoint temperature;
said heat transfer element being made linearly responsive to the linearized response of said sensor for controlling the temperature of said thermal system to the desired setpoint temperature, such that the heat transferred by said heat transfer element is substantially linearly related to the error between said desired temperature and the temperature sensed by said sensor.

18. A method for controlling the temperature of a variable setpoint temperature thermal system, comprising:
providing a heat transfer element configured to be thermally coupled to said thermal system;
providing a temperature sensor having an exponentially nonlinear temperature response and configured to sense the temperature of said thermal system;
providing a linearizing element for linearizing the temperature response of said sensor to make the controller sensitivity independent of setpoint temperature; and
adapting said heat transfer element to be responsive to the linearized response of said sensor.

19. A method for controlling the temperature of a thermal system, comprising:
providing a heat transfer element configured to be thermally coupled to said thermal system;
providing a temperature sensor configured to sense the temperature of said thermal system; and
configuring said heat transfer element to be linearly responsive to said sensor for controlling the temperature of said thermal system to a desired setpoint temperature, such that the heat transferred by said heat transfer element is substantially linearly related to the error between said desired setpoint temperature and the temperature sensed by said sensor, said linear relationship being independent of the setting of the setpoint temperature.

20. A method of linearizing a thermistor temperature sensor for controlling the temperature of a variable setpoint thermal system to a desired setpoint temperature, comprising:
providing a current source for controlling the current through said thermistor, said current being controlled by said current source such that the thermistor voltage is substantially equal to a predetermined voltage when said thermistor is at said desired setpoint temperature, said predetermined voltage being the same for any setpoint temperature.

21. A method of linearizing a thermistor temperature sensor for controlling the temperature of a variable setpoint temperature thermal system to a desired setpoint temperature, comprising:
providing a voltage source for controlling the voltage across said thermistor, said voltage being controlled by said voltage source such that thermistor current is substantially equal to a predetermined current when said thermistor is at said desired setpoint temperature, said predetermined current being the same for any setpoint temperature.

* * * * *

UNITED STATES PATENT AND TRADEMARK OFFICE
CERTIFICATE OF CORRECTION

PATENT NO. : 5,023,431

DATED : June 11, 1991

INVENTOR(S) : James K. Roberge

It is certified that error appears in the above-identified patent and that said Letters Patent is hereby corrected as shown below:

Col. 6, line 49, delete "therminstor" and insert ---thermistor---.

Signed and Sealed this

Twenty-second Day of September, 1992

Attest:

DOUGLAS B. COMER

Attesting Officer

Acting Commissioner of Patents and Trademarks